US012676312B2

(12) United States Patent
Yang et al.

(10) Patent No.: US 12,676,312 B2
(45) Date of Patent: Jul. 7, 2026

(54) POSITIVE ELECTRODE ACTIVE MATERIAL CONTAINING THERMALLY EXPANDED-REDUCED GRAPHENE OXIDE WITH A MONTMORILLONITE ADDITIVE, AND A LITHIUM-SULFUR SECONDARY BATTERY THEREOF

(71) Applicant: LG ENERGY SOLUTION, LTD., Seoul (KR)

(72) Inventors: Seungbo Yang, Daejeon (KR);
Suenghoon Han, Daejeon (KR);
Myeongseong Kim, Daejeon (KR);
Kwonnam Sohn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 809 days.

(21) Appl. No.: 17/771,118

(22) PCT Filed: Dec. 30, 2020

(86) PCT No.: PCT/KR2020/019443
§ 371 (c)(1),
(2) Date: Apr. 22, 2022

(87) PCT Pub. No.: WO2021/137635
PCT Pub. Date: Jul. 8, 2021

(65) Prior Publication Data
US 2022/0376252 A1     Nov. 24, 2022

(30) Foreign Application Priority Data
Jan. 3, 2020     (KR) ........................ 10-2020-0000575

(51) Int. Cl.
H01M 4/62          (2006.01)
H01M 4/02          (2006.01)
(Continued)

(52) U.S. Cl.
CPC ............. *H01M 4/62* (2013.01); *H01M 4/133* (2013.01); *H01M 4/136* (2013.01); *H01M 4/364* (2013.01);
(Continued)

(58) Field of Classification Search
CPC ........ H01M 4/62; H01M 4/133; H01M 4/136; H01M 4/364; H01M 4/38; H01M 4/5815;
(Continued)

(56) References Cited

U.S. PATENT DOCUMENTS 6,544,689 B1 *   4/2003   Riley ................ H01M 10/0525
                                                                          429/304
2016/0164103 A1   6/2016   Son et al.
(Continued)

FOREIGN PATENT DOCUMENTS

CN          102097622 A        6/2011
CN          106374095 A        2/2017
(Continued)

OTHER PUBLICATIONS

KR20020020312 HO machine translation to English of desc Doc KR100420145B1 from Espacenet (Year: 2025).*
(Continued)

*Primary Examiner* — Maria Laios
*Assistant Examiner* — Lawrence La Raia, III
(74) *Attorney, Agent, or Firm* — Birch, Stewart, Kolash & Birch, LLP

(57)                    ABSTRACT
Disclosed is a positive electrode for a lithium secondary battery and a lithium secondary battery including the same. More particularly, disclosed is a positive electrode for a lithium secondary battery including a sulfur-carbon composite including thermally expanded-reduced graphene oxide as a positive electrode active material and montmorillonite as an additive. The positive electrode for the lithium
(Continued)

secondary battery not only has excellent electrochemical reactivity, but also improves the problem due to leaching of lithium polysulfide, thereby improving capacity and lifetime characteristics of the lithium secondary battery.

6 Claims, 4 Drawing Sheets

(51) Int. Cl.

| | |
|---|---|
| *H01M 4/133* | (2010.01) |
| *H01M 4/136* | (2010.01) |
| *H01M 4/36* | (2006.01) |
| *H01M 4/38* | (2006.01) |
| *H01M 4/58* | (2010.01) |
| *H01M 4/583* | (2010.01) |
| *H01M 10/052* | (2010.01) |

(52) U.S. Cl.
CPC .......... *H01M 4/38* (2013.01); *H01M 4/5815* (2013.01); *H01M 4/583* (2013.01); *H01M 10/052* (2013.01); *H01M 2004/021* (2013.01); *H01M 2004/028* (2013.01); *Y02E 60/10* (2013.01)

(58) Field of Classification Search
CPC .............. H01M 4/583; H01M 10/052; H01M 2004/028; Y02E 60/10
See application file for complete search history.

(56) References Cited

U.S. PATENT DOCUMENTS

| | | | |
|---|---|---|---|
| 2017/0358800 A1 | 12/2017 | Sun et al. | |
| 2018/0219215 A1 | 8/2018 | Bucur et al. | |
| 2018/0287121 A1* | 10/2018 | Kim ..................... | H01M 50/44 |

FOREIGN PATENT DOCUMENTS

| | | | |
|---|---|---|---|
| CN | 109148841 A | 1/2019 |
| CN | 110323443 A | 10/2019 |
| JP | 2004-113859 A | 4/2004 |
| KR | 10-2002-0020312 A | 3/2002 |
| KR | 10-2015-0001098 A | 1/2015 |
| KR | 10-2016-0037084 A | 4/2016 |
| KR | 10-2016-0046775 A | 4/2016 |
| KR | 10-2016-0078734 A | 7/2016 |
| KR | 10-2016-0078821 A | 7/2016 |
| KR | 10-2016-0097026 A | 8/2016 |
| KR | 10-2017-0139761 A | 12/2017 |
| KR | 10-2018-0057360 A | 5/2018 |
| KR | 10-1957248 B1 | 3/2019 |
| KR | 10-1977675 B1 | 5/2019 |
| KR | 10-2019-0083397 A | 7/2019 |

OTHER PUBLICATIONS

International Search Report (PCT/ISA/210) issued in PCT/KR2020/019443 mailed on Apr. 26, 2021.

Huang et al., "Entrapment of sulfur in hierarchical porous graphene for lithium-sulfur batteries with high rate performance from −40 to 60° C.," Nano Energy, vol. 2, 2013, pp. 314-321.

Chen et al., "Atomic Interlamellar Ion Path in High Sulfur Content Lithium-Montmorillonite Host Enables High-Rate and Stable Lithium-Sulfer Battery," Adv Mater., vol. 30, 2018, pp. 1-8, XP55973510.

Chen et al., "Atomic Interlamellar Ion Path in High Sulfur Content Lithium-Montmorillonite Host Enables High-Rate and Stable Lithium-Sulfur Battery," Adv. Mater, Supporting Information, 2018, pp. 1-16. (17 pages total), XP55973534.

Extended European Search Report for European Application No. 20911182.2, dated Oct. 31, 2022.

Li et al., "High-rate lithium-sulfur batteres promoted by reduced graphene oxide conting," Chem Commun, vol. 48, 2012, pp. 4106-4108, XP55973548.

Li et al., "Supplementary information High-rate lithium-sulfur batteries promoted by reduced graphene oxide coating," The Royal Society of Chemistry, 2012, 4 pages total, XP55973549.

* cited by examiner

[Figure 1]
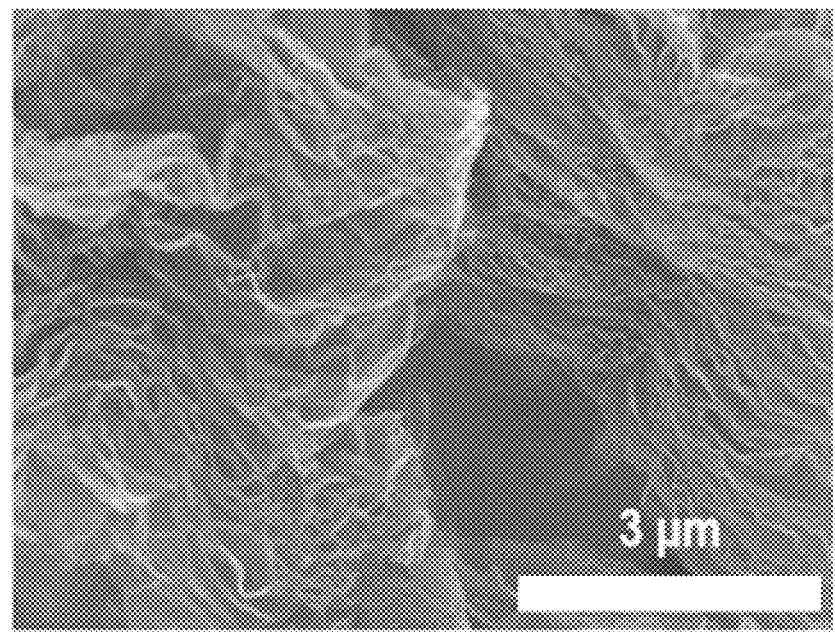
[Figure 2]
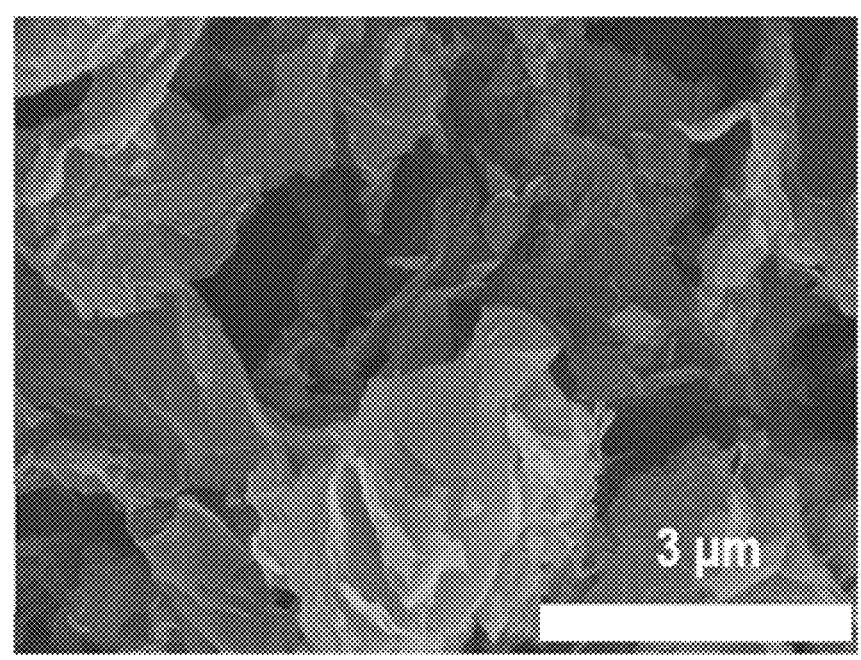

[Figure 3]
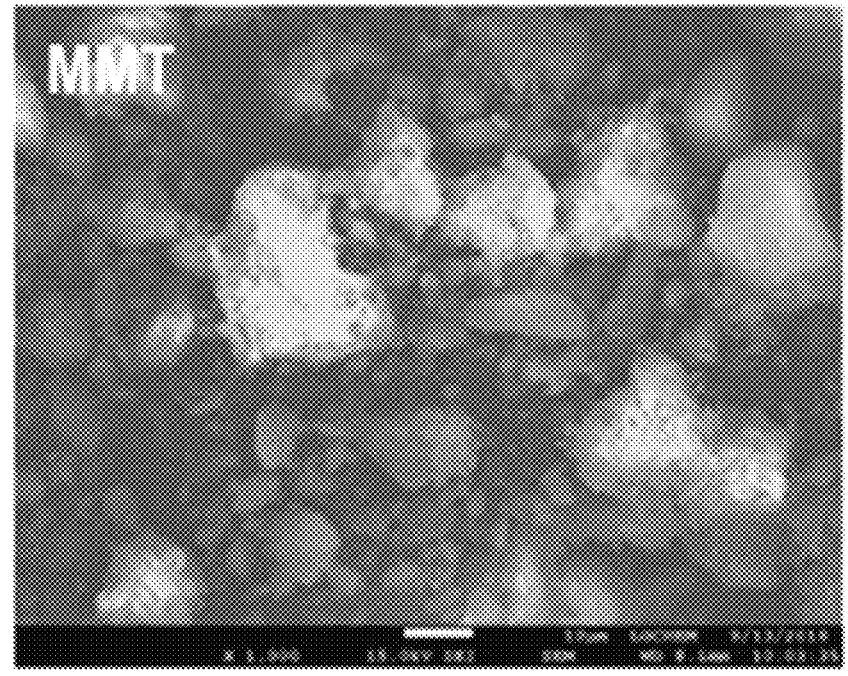
[Figure 4]
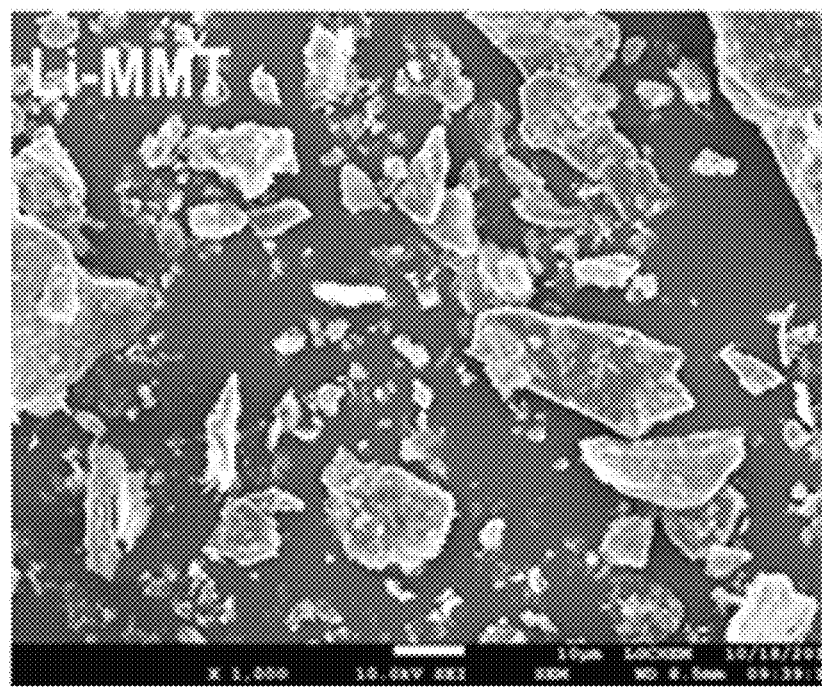

[Figure 5]
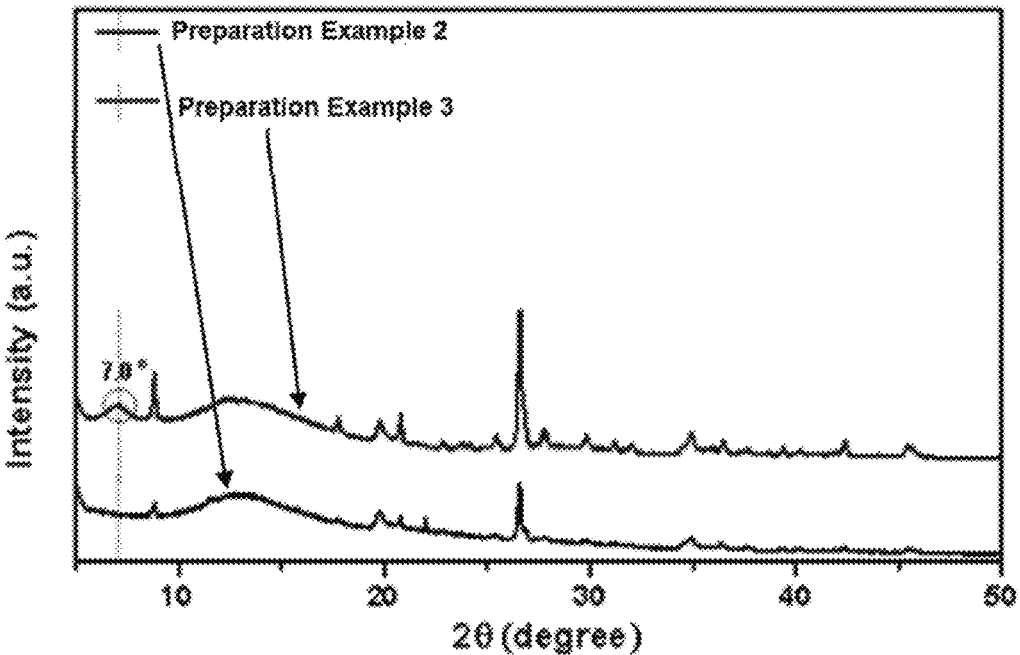
[Figure 6]
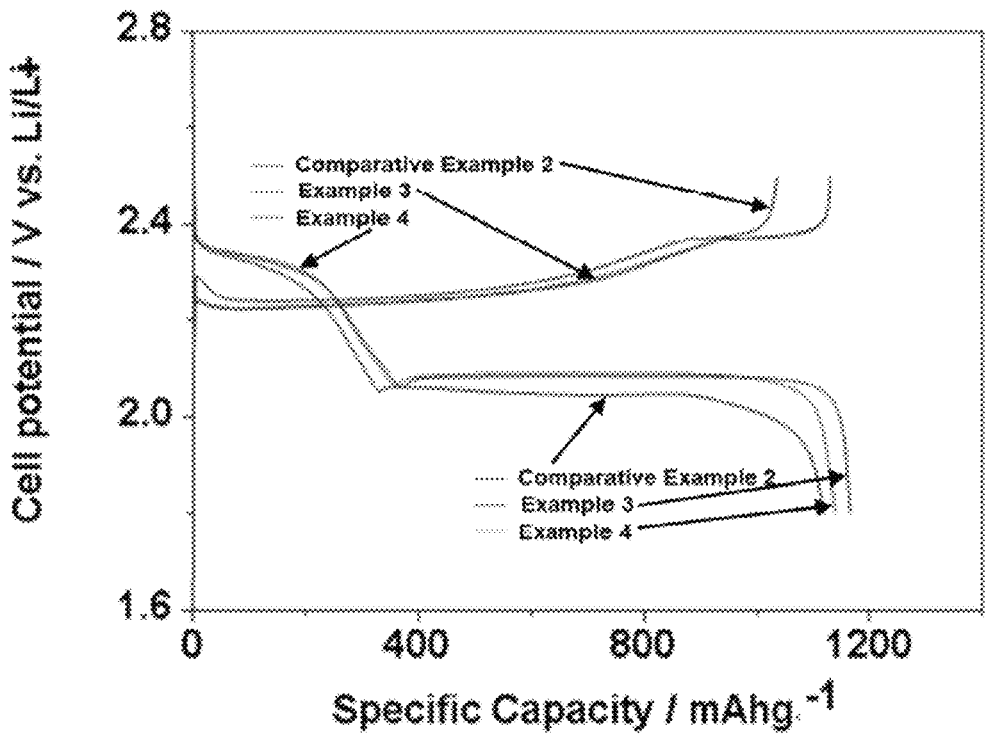

[Figure 7]
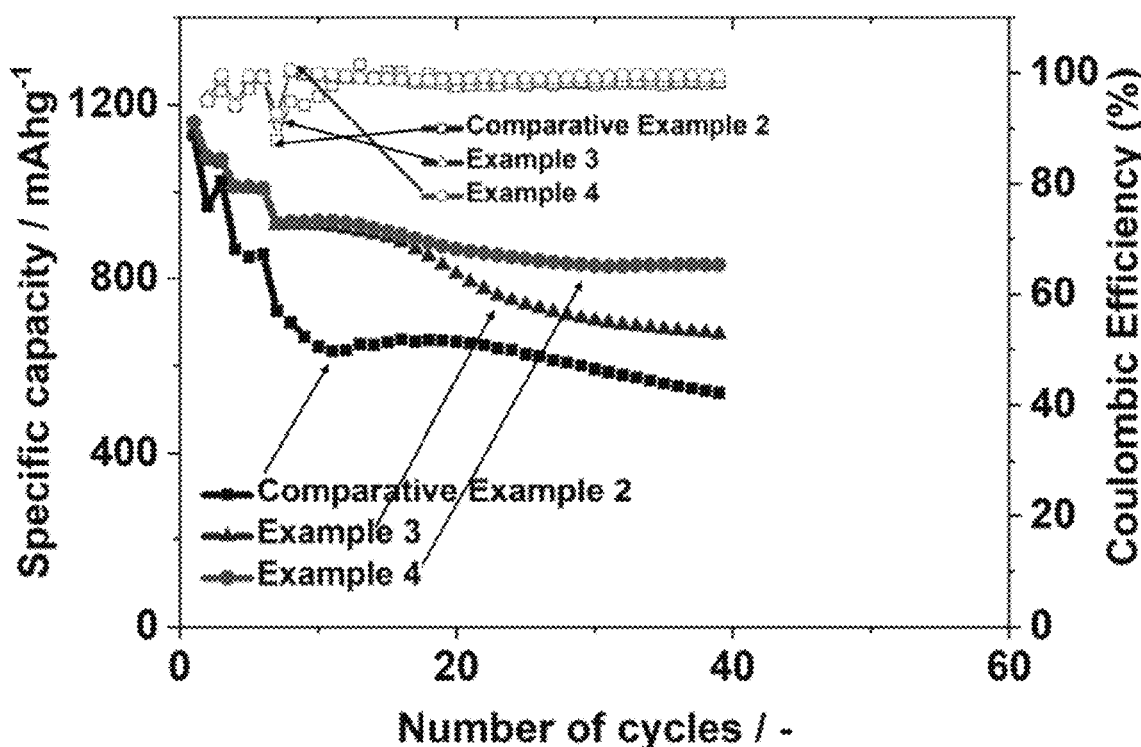

POSITIVE ELECTRODE ACTIVE MATERIAL CONTAINING THERMALLY EXPANDED-REDUCED GRAPHENE OXIDE WITH A MONTMORILLONITE ADDITIVE, AND A LITHIUM-SULFUR SECONDARY BATTERY THEREOF

TECHNICAL FIELD

The present application claims the benefit of priority based on Korean Patent Application No. 10-2020-0000575 filed on Jan. 3, 2020, the entire contents of which are incorporated herein by reference.

The present invention relates to a positive electrode for a lithium secondary battery and a lithium secondary battery comprising the same.

BACKGROUND ART

As the utilization range of lithium secondary batteries is expanded not only to portable electronic devices and communication devices, but also to electric vehicles (EV) and electric storage systems (ESS), the demand for high capacity of lithium secondary batteries used as their power sources is increasing.

The lithium-sulfur battery among various lithium secondary batteries is a battery system using a sulfur-based material having an S—S bond (sulfur-sulfur bond) as a positive electrode active material and using lithium metal, a carbon-based material in which intercalation/deintercalation of lithium ions occurs, or silicon or tin that forms an alloy with lithium as a negative electrode active material.

There is an advantage that sulfur, which is the main material of the positive electrode active material in the lithium-sulfur battery, has a low atomic weight, is very rich in resources and thus easy to supply and receive, and is cheap, non-toxic and environmentally friendly.

In addition, the lithium-sulfur battery has a theoretical capacity of 1,675 mAh/g derived from a conversion reaction of lithium ion and sulfur ($S_8+16Li^++16e^-\rightarrow 8Li_2S$) in the positive electrode, and when using lithium metal (theoretical capacity: 3,860 mAh/g) as a negative electrode, has a theoretical energy density of 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li-MnO$_2$ battery: 1,000 Wh/kg, Na—S battery: 800 Wh/kg) and the lithium ion battery (250 Wh/kg), the lithium-sulfur battery is attracting attention as a high-capacity, eco-friendly and low-cost lithium secondary battery among secondary batteries that have been developed to date, and is a next-generation battery system to which several studies are being conducted.

In the case of the lithium-sulfur battery, when discharging it, the reduction reaction in which the sulfur accepts the electrons is proceeded at the positive electrode and the oxidation reaction in which lithium is ionized is proceeded at the negative electrode, respectively.

In this lithium-sulfur battery, since sulfur, which is a positive electrode active material, has an electrical conductivity of $5\times10^{-30}$ S/cm and thus is a non-conductor without electrical conductivity, there is a problem that it is difficult to move electrons generated by an electrochemical reaction. Thus, sulfur is complexed and used with an electrically conductive material such as carbon that can provide an electrochemical reaction site. However, in this case, since other conductive materials are comprised in the positive electrode active material together, there is a problem that the electrochemical reactivity of the positive electrode is insufficient, and accordingly, the energy density of the entire battery is lowered.

In addition, during discharging the lithium-sulfur battery, lithium polysulfides ($Li_2S_x$, x=2~8) are produced at the positive electrode. As some of these are readily dissolved in the electrolyte and leached from the positive electrode, not only the reversible capacity of the positive electrode is greatly reduced, but also the dissolved lithium polysulfide diffuses into the negative electrode, causing various side reactions. In addition, this lithium polysulfide causes a shuttle reaction during the charging process, greatly reducing charging/discharging efficiency.

Due to the above-described problems, the lithium-sulfur battery has a high initial capacity in actual operation, but the capacity and charging/discharging efficiency characteristics are rapidly deteriorated as the cycle progresses, and accordingly, the lifetime is also shortened, and thus it is difficult to secure sufficient performance and operation stability, and it is not commercially available.

Accordingly, various technologies have been proposed to improve the capacity and lifetime of the battery by solving major problems related to lithium-sulfur battery.

For example, Korean Laid-open Patent Publication No. 2017-0139761 discloses that the capacity and lifetime of a battery can be improved by providing a positive electrode active material layer, which contains a nitrogen-doped carbon material, and a protective layer, and incorporating chitosan as a binder into the positive electrode active layer, thereby delaying the leaching of lithium polysulfide.

In addition, Korean Laid-open Patent Publication No. 2016-0046775 discloses that the cycle characteristics of the battery can be improved by providing a positive electrode coating layer made of amphiphilic polymer on a part of the surface of the active part of the positive electrode including sulfur-carbon composite to inhibit leaching of lithium polysulfide and to facilitate the movement of lithium ions.

In addition, Korean Laid-open Patent Publication No. 2016-0037084 discloses that the lithium polysulfide can be prevented from dissolving out, and the conductivity of the sulfur-carbon nanotube composite and the loading amount of sulfur can be increased, by coating graphene on carbon nanotube aggregates containing sulfur.

These patents have improved the problem of deteriorating the performance or lifetime of the lithium-sulfur battery to some extent by introducing a material having the ability to adsorb the lithium polysulfide to the positive electrode as an additive or in the form of coating layer, or changing the material or structure for the positive electrode, thereby preventing the leaching of lithium polysulfide and the loss of sulfur due to this, but the effect is not sufficient. In addition, the method proposed in these patents is not only somewhat complicated, but also has a problem that the amount of sulfur that can be added (i.e. the loading amount) is limited. Therefore, it is still necessary to develop a lithium-sulfur battery having excellent performance by solving the leaching problem of lithium polysulfide while increasing the loading amount of sulfur in the positive electrode.

PRIOR ART DOCUMENTS

Patent Documents (Patent Document 1) Korean Laid-open Patent Publication No. 2017-0139761 (Dec. 20, 2017), Cathode for metal-sulfur battery having cathode active material layer containing N-doped carbon and protective film
(Patent Document 2) Korean Laid-open Patent Publication No. 2016-0046775 (Apr. 29, 2016), CATHODE FOR LITHIUM-SULFUR BATTERY AND METHOD OF PREPARING THE SAME
(Patent Document 3) Korean Laid-open Patent Publication No. 2016-0037084 (Apr. 5, 2016), SURFUR-CARBON-NANOTUBE COMPLEX, METHOD OF PREPARING THE SAME, CATHODE ACTIVE MATERIAL FOR LITHIUM-SULFUR BATTERY INCLUDING THE SAME AND LITHIUM-SULFUR BATTERY INCLUDING THE SAME

DISCLOSURE

Technical Problem

Accordingly, as a result of conducting various studies to solve the above problems, the inventors of the present invention have confirmed that when the positive electrode comprises a positive electrode active material containing thermally expanded-reduced graphene oxide and an additive containing montmorillonite, not only the loading amount of sulfur in the positive electrode is improved, but also electrochemical reactivity of the positive electrode and the leaching problem of lithium polysulfide are improved, thereby improving the capacity and lifetime of the lithium secondary battery, and thus have completed the present invention.

Therefore, it is an object of the present invention to provide a positive electrode for a lithium secondary battery that contains sulfur in a high content, has excellent electrochemical reactivity, and improves problems caused by lithium polysulfide.

In addition, it is another object of the present invention to provide a lithium secondary battery comprising the positive electrode.

Technical Solution

In order to achieve the above objects, the present invention provides a positive electrode for a lithium secondary battery comprising a positive electrode active material and an additive, wherein the positive electrode active material comprises sulfur-carbon composite containing thermally expanded-reduced graphene oxide and sulfur, and the additive comprises montmorillonite.

The sulfur-carbon composite may comprise the thermally expanded-reduced graphene oxide and sulfur contained in at least part of the inner and outer surfaces of the thermally expanded-reduced graphene oxide.

The thermally expanded-reduced graphene oxide may have a crumpled paper structure.

The thermally expanded-reduced graphene oxide may have a specific surface area of 500 to 1200 $m^2$/g.

The thermally expanded-reduced graphene oxide may have a pore volume of 3 to 7 $cm^3$/g.

The thermally expanded-reduced graphene oxide may have an electrical conductivity of 20 to 200 S/cm.

The sulfur may be at least one selected from the group consisting of $Li_2S_n(n \geq 1)$, a disulfide compound, an organic sulfur compound, and a carbon-sulfur polymer $((C_2S_x)_n$: x=2.5 to 50, $n \geq 2$).

The montmorillonite may comprise at least one selected from the group consisting of sodium montmorillonite, calcium montmorillonite, and magnesium montmorillonite.

The additive may comprise montmorillonite modified by cation exchange.

The modified montmorillonite may be one in which the cation of montmorillonite is substituted with one or more ions selected from hydrogen ions, lithium ions, potassium ions, rubidium ions, cesium ions, iron ions, manganese ions, and nickel ions.

The additive may be contained in an amount of 1 to 10% by weight based on a total amount of 100% by weight of the positive electrode active material layer.

In addition, the present invention provides a lithium secondary battery comprising the positive electrode for the lithium secondary battery.

Advantageous Effects

The positive electrode for the lithium secondary battery according to the present invention contains a thermally expanded-reduced graphene oxide having a high specific surface area and pore volume as a carrier for sulfur, and thus can evenly support a large amount of sulfur, thereby improving the loading amount of sulfur in the positive electrode for the lithium secondary battery, and contains montmorillonite as an additive and thus can improve the mobility of lithium ions in the positive electrode and also can improve the electrochemical reactivity of the positive electrode by suppressing leaching of lithium polysulfide and improve discharging capacity of the battery in a high rate section.

Accordingly, the lithium secondary battery comprising the positive electrode according to the present invention has excellent initial discharging capacity and does not cause a decrease in capacity at the high-rate section, thereby enabling high capacity and long lifetime of the battery.

DESCRIPTION OF DRAWINGS

FIG. 1 is a scanning electron microscope (SEM) image of the thermally expanded-reduced graphene oxide according to Preparation Example 1.

FIG. 2 is a scanning electron microscope (SEM) image of the reduced graphene oxide.

FIG. 3 is a scanning electron microscope (SEM) image of the montmorillonite according to Preparation Example 2.

FIG. 4 is a scanning electron microscope (SEM) image of the montmorillonite according to Preparation Example 3.

FIG. 5 is a graph showing the results of X-ray diffraction analysis of the montmorillonite according to Preparation Examples 2 and 3.

FIG. 6 is a graph showing evaluation results of initial discharging capacity of the lithium secondary battery according to Experimental Example 3.

FIG. 7 is a graph showing evaluation results of lifetime characteristics of the lithium secondary battery according to Experimental Example 3.

BEST MODE

Hereinafter, the present invention will be described in more detail.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used in the present invention is for the purpose of describing particular embodiments only and is not intended to be limiting of the invention. The singular forms "a," "an," and "the" include plural referents unless the context clearly dictates otherwise. It is to be understood that the terms "comprise" or "have" as used in the present invention, are intended to designate the presence of stated features, numbers, steps, operations, components, parts or combinations thereof, but not to preclude the possibility of the presence or addition of one or more other features, numbers, steps, operations, components, parts, or combinations thereof.

The term "composite" as used herein refers to a material that two or more materials are combined to express a more effective function while forming physically and chemically different phases to each other.

The term "polysulfide" used in the present invention has a concept including both "polysulfide ion ($S_x^{2-}$, x=8, 6, 4, 2)" and "lithium polysulfide ($Li_2S_x$ or $LiS_x^-$, x=8, 6, 4, 2)".

The lithium-sulfur battery has higher theoretical discharging capacity and theoretical energy density than other various secondary batteries, and is attracting attention as a next-generation secondary battery due to the advantage that sulfur, which is used as a positive electrode active material, is rich in resources and is cheap and environmentally friendly.

Sulfur, which is used as a positive electrode active material in lithium-sulfur batteries, is a non-conductor, and thus it is essential that sulfur is used in a composite form with a carbon material that is an electrically conductive material, in order to compensate for the low electrical conductivity. However, since only sulfur cannot be used as a positive electrode active material, and other materials such as electrically conductive materials other than sulfur are comprised together, it was difficult to secure sufficient reactivity to the oxidation/reduction reaction of sulfur in the positive electrode, making it impossible to implement a lithium-sulfur battery with high energy density.

In addition, as discharging is proceeded in the lithium-sulfur battery, the sulfur is continuously converted from the cyclic $S_8$ structure to the linear structures of lithium polysulfides ($Li_2S_x$, x=8, 6, 4, 2) by continuously reacting with lithium ions and, when the lithium polysulfides are completely reduced, lithium sulfide ($Li_2S$) is finally produced. Among the lithium polysulfides which are the intermediate products of this sulfur reduction reaction (discharging), lithium polysulfides ($Li_2S_x$, usually x>4), which has the high oxidation number of sulfur, are substances with a strong polarity, and are easily dissolved in the electrolyte comprising a hydrophilic organic solvent and thus released outside the reaction zone of the positive electrode, thereby no longer participating in the electrochemical reaction and thus resulting in the loss of sulfur.

Despite advantages as described above, since the amount of sulfur involved in the electrochemical reaction is sharply reduced due to this leaching of the lithium polysulfide, the lithium-sulfur battery does not realize all of theoretical capacity and energy density in actual operation. In addition, the leached lithium polysulfide reacts with lithium in the negative electrode to form solid lithium sulfide on the surface of the negative electrode. There is a problem that the solid lithium sulfide does not decompose even during charging, so it acts as an irreversible capacity, and interferes with the electrochemical reaction on the surface of the negative electrode, thereby accelerating the deterioration of capacity and lifetime characteristics. In addition, there is a problem that the lithium polysulfide is not completely reduced while shuttling between the positive electrode and the negative electrode and undergoes a cycle reaction that consumes electrons, thereby reducing charging and discharging efficiency.

In order to solve these problems, in the prior art, a method of introducing a material capable of inhibiting the leaching of the lithium polysulfide into the positive electrode or separator in the form of an additive or a protective layer or a method of changing the structure or material of the positive electrode active material has been proposed. However, there are disadvantages that such a method is not only insufficient in improving the effect of the leaching of the lithium polysulfide, but also has limitations in the amount of loading of sulfur, causes serious problems in the stability of the battery or is inefficient in view of the process.

Accordingly, the present invention provides a positive electrode for a lithium secondary battery, which improves the loading amount of sulfur and improves the problems of reduction of electrochemical reactivity of a positive electrode due to leaching of lithium polysulfide and shuttle phenomenon, and reduction of discharging capacity and energy density of a battery, by supplementing the problem of the positive electrode for the conventional lithium secondary battery as described above.

Specifically, the positive electrode for the lithium secondary battery according to the present invention is characterized in that it contains a sulfur-carbon composite containing a thermally expanded-reduced graphene oxide (TE-rGO) as a carrier for sulfur, as a positive electrode active material, and contains montmorillonite, a kind of clay mineral, as the additive, while containing a positive electrode active material and an additive.

The positive electrode for the lithium secondary battery of the present invention contains a sulfur-carbon composite containing the thermally expanded-reduced graphene oxide and sulfur as a positive electrode active material.

Specifically, the sulfur-carbon composite may be one containing thermally expanded-reduced graphene oxide and sulfur contained in at least part of the inner and outer surfaces of the thermally expanded-reduced graphene oxide.

The sulfur-carbon composite of the present invention contains thermally expanded-reduced graphene oxide (TE-rGO) as a carbon material used as a carrier for uniformly and stably fixing sulfur.

In the present invention, the thermally expanded-reduced graphene oxide is manufactured through thermal expansion and reduction steps, and graphene oxide having physical properties as described later is defined as thermally expanded-reduced graphene oxide (TE-rGO).

Graphene oxide (GO) is formed by oxidizing graphite to form an oxide, and comprises graphite oxide. Such graphene oxide has a form in which oxygen-containing functional groups such as a hydroxy group, an epoxide group, a carboxyl group, and a ketone group are contained in the carbon layer, and can be thinned when reducing them. In the case of reduced graphene oxide (rGO), since it has a higher specific surface area than graphene oxide, a case of applying it as a carrier for sulfur is known in the prior art. However, since the reduced graphene oxide used in the prior art has a two-dimensional structure, when it is used as a carrier of sulfur, which is a positive electrode active material, the movement of lithium ions is limited, and thus a satisfactory effect of improving the performance of the battery cannot be secured. Thus, in the present invention, graphene oxide was introduced as a carrier for sulfur, considering that in the case of thermally expanded-reduced graphene oxide obtained by thinning graphene oxide through thermal expansion and then reducing it by heat treatment, as graphene oxide has a crumpled paper structure, which is a kind of sheet shape, it can exhibit improved specific surface area, pore volume, and electrical conductivity than general graphene oxide and reduced graphene oxide. Accordingly, it is possible to implement a lithium secondary battery having excellent capacity and lifetime characteristics by improving the electrochemical reactivity of sulfur as well as allowing a greater amount of sulfur to be evenly supported on the inner and outer surfaces.

In addition, in the case of general graphene oxide, the ratio of carbon and oxygen based on the molar ratio is about 1:1 and in the case of reduced graphene oxide reduced by the prior art without a separate thermal expansion process, the ratio of carbon and oxygen based on the molar ratio is changed to about 9:1. However, the reduced graphene oxide does not thermally expand, and thus does not have a crumpled structure, and has a two-dimensional stacking structure as described above.

As the thermally expanded-reduced graphene oxide according to the present invention is also reduced, the ratio of carbon and oxygen is about 9:1, but it has a crumpled paper structure as described above as the oxygen functional groups on the surface of graphene oxide are removed by thermal expansion. Specifically, in the case of the thermally expanded-reduced graphene oxide, as the oxygen functional groups contained in the graphene oxide are removed by heat due to thermal expansion, and the content of the oxygen functional group is reduced to about 10% by weight or less, since the thermally expanded-reduced graphene oxide exhibits a crumpled paper structure, it exhibits higher specific surface area and pore volume than graphene oxide and reduced graphene oxide, and may have improved electrical conductivity.

Specifically, the thermally expanded-reduced graphene oxide may have a specific surface area of 500 to 1200 m²/g, preferably 700 to 1000 m²/g. The specific surface area can be measured through a conventional BET (Brunauer & Emmett & Teller) method. In the case of graphene oxide, the specific surface area is about 100 m²/g, and in the case of reduced graphene oxide used as a carrier of sulfur in the prior art, the specific surface area is about 900 m²/g, whereas the thermally expanded-reduced graphene oxide according to the present invention exhibits an increased specific surface area as described above, so that a large amount of sulfur can be evenly supported.

In addition, the thermally expanded-reduced graphene oxide may have a pore volume of 3 to 7 cm³/g, preferably 4 to cm³/g. Compared with the conventional reduced graphene oxide used in sulfur-carbon composite with a pore volume of about 1 to 2 cm³/g, the thermally expanded-reduced graphene oxide of the present invention has a high pore volume as described above and thus can effectively support sulfur and is also effective in improving the electrochemical reactivity of sulfur.

If the specific surface area and pore volume of the thermally expanded-reduced graphene oxide are less than the above range, the effect of improving the sulfur content and reactivity cannot be secured. On the contrary, if the specific surface area and pore volume of the thermally expanded-reduced graphene oxide exceed the above range, there may be a problem that side reactions may occur due to an excessive increase in surface area, and the content of the binder may increase when preparing the positive electrode slurry.

The thermally expanded-reduced graphene oxide may have an electrical conductivity of 20 to 200 S/cm, preferably 80 to 140 S/cm. In the case of the thermally expanded-reduced graphene oxide according to the present invention, high electrical conductivity can be exhibited compared to the reduced graphene oxide prepared by the conventional method.

The thermally expanded-reduced graphene oxide contains irregular pores on the inner and outer surfaces, the average diameter of the pores is in the range of 1 to 200 nm, and the porosity may be in the range of 10 to 90% of the total volume. If the average diameter of the pores is less than the above range, impregnation of sulfur is impossible because the pore size is only at the molecular level. On the contrary, if the average diameter of the pores exceeds the above range, the mechanical strength of the thermally expanded-reduced graphene oxide is weakened, which is not preferable for application to the electrode manufacturing process.

The thermally expanded-reduced graphene oxide of the present invention may be prepared by heat-treating graphene oxide to prepare thermally expanded graphene oxide, and then reducing the thermally expanded graphene oxide by heat-treating again.

As an example, the method of preparing the thermally expanded-reduced graphene oxide comprises the steps of
  (a) thermally expanding the graphene oxide by heat treatment at a temperature of 300 to 500° C.; and
  (b) reducing the thermally expanded graphene oxide by heat treatment at a temperature of 700 to 1200° C.

First, step (a) is a step of thermally expanding graphene oxide by heat treatment.

As the heat treatment is performed, the oxygen functional groups of the graphene oxide are easily removed, so that thermal expansion of the graphene oxide may easily occur. As described above, when the thermal expansion of the graphene oxide occurs, the oxygen functional groups of the graphene oxide may be removed by thermal shock, thereby having an expanded-crumpled paper structure.

The graphene oxide in step (a) may be in a powder form. Since graphene oxide having a film form has a stacked structure, thermally expanded-reduced graphene oxide having a desired specific surface area cannot be obtained. Therefore, in the present invention, it is preferable to use graphene oxide in a powder form.

In addition, the heat treatment may be performed at a temperature of 300 to 500 for 5 to 30 minutes, preferably at a temperature of 350 to 450 for 5 to 15 minutes. If the temperature and time period for the heat treatment is less than the above range, thermal expansion of the graphene oxide does not sufficiently occur, so that a high specific surface area cannot be obtained. If the temperature and time period for the heat treatment exceed the above range, the yield may be decreased.

Next, step (b) is a step of reducing the thermally expanded graphene oxide prepared in step (a) by heat treatment.

As the additional heat treatment is performed in step (b), a reduction process of thermally expanded graphene oxide may occur, thereby finally obtaining a thermally expanded-reduced graphene oxide having a crumpled paper structure.

In addition, the heat treatment in step (b) may be performed at a temperature of 700 to 1200 for 1 to 5 hours, and preferably at a temperature of 800 to 1000 for 2 to 4 hours. If the temperature and time period for the heat treatment is less than the above range, thermal expansion of the thermally expanded graphene oxide does not sufficiently occur, so that a high specific surface area cannot be obtained. If the temperature and time period for the heat treatment exceed the above range, the yield may be decreased.

The thermally expanded-reduced graphene oxide has a crumpled paper structure through thermal expansion and reduction steps, and accordingly, can exhibit a high specific surface area and pore volume.

The thermally expanded-reduced graphene oxide of the present invention prepared by the above-described preparation method has a crumpled paper structure, and accordingly, a high specific surface area and pore volume can evenly support a large amount of sulfur. Therefore, the sulfur-carbon composite loaded with sulfur contained in at least part of the inner and outer surfaces of the thermally expanded-reduced graphene oxide can evenly support a large amount of sulfur, thereby improving the reactivity of the lithium secondary battery using it as a positive electrode active material, and thus realizing excellent initial discharging capacity and lifetime characteristics.

The sulfur-carbon composite of the present invention contains sulfur along with the thermally expanded-reduced graphene oxide described above.

The sulfur may be at least one selected from the group consisting of inorganic sulfur ($S_8$), $Li_2S_n$(n≥1), a disulfide compound, an organic sulfur compound, and a carbon-sulfur polymer (($C_2S_x)_n$:x=2.5 to 50, n≥2). Preferably, the sulfur may be inorganic sulfur.

The sulfur in the sulfur-carbon composite according to the present invention is located on at least one of the inner and outer surfaces of the thermally expanded-reduced graphene oxide, and for example, may be present in less than 100%, preferably 1 to 95%, more preferably 60 to 90% of the entire inner and outer surfaces of the thermally expanded-reduced graphene oxide. If the sulfur is present within the above range on the inner and outer surfaces of the thermally expanded-reduced graphene oxide, the maximum effect may be exhibited in terms of electron transfer area and wettability with an electrolyte. Specifically, since sulfur in the above range is thinly and evenly impregnated on the inner and outer surfaces of the thermally expanded-reduced graphene oxide, the electron transfer contact area can be increased during the charging/discharging process. If the sulfur is located in 100% of the entire inner and outer surface of the thermally expanded-reduced graphene oxide, the thermally expanded-reduced graphene oxide is completely covered with sulfur, thereby having poor wettability to the electrolyte, and is deteriorated in contact characteristics with the electrically conductive material contained in the electrode, so that it cannot participate in the electrochemical reaction because it cannot receive electrons.

The sulfur-carbon composite may contain 60 to 90 parts by weight, preferably 65 to 85 parts by weight, more preferably 70 to 80 parts by weight of sulfur based on 100 parts by weight of the sulfur-carbon composite. If the content of the sulfur is less than the above-mentioned range, as the content of the thermally expanded-reduced graphene oxide in the sulfur-carbon composite is relatively increased, the specific surface area is excessively increased, so that the content of the binder should be increased when preparing the positive electrode. Increasing the amount of use of the binder may eventually increase the sheet resistance of the positive electrode and acts as an insulator preventing electron pass, thereby deteriorating the performance of the battery. On the contrary, if the content of the sulfur exceeds the above-mentioned range, as the sulfurs that do not combine with the thermally expanded-reduced graphene oxide are aggregated with each other or re-leached to the surface of the thermally expanded-reduced graphene oxide, it is difficult to receive electrons and thus cannot participate in the electrochemical reaction, resulting in capacity loss of the battery.

The method for preparing the sulfur-carbon composite of the present invention is not particularly limited in the present invention, and a method commonly used in the art may be used. For example, a method of complexing by simply mixing the thermally expanded-reduced graphene oxide of the present invention and sulfur and then heat-treating may be used.

The positive electrode active material may further comprise at least one additive selected from a transition metal element, a group IIIA element, a group IVA element, a sulfur compound of these elements, and an alloy of these elements and sulfur, in addition to the above-described components.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg or the like, the group IIIA element may comprise Al, Ga, In, Tl or the like, and the group IVA element may comprise Ge, Sn, Pb or the like.

In the positive electrode for the lithium secondary battery of the present invention, the positive electrode active material may be contained in an amount of 50 to 95% by weight, preferably 70 to 90% by weight, more preferably 85 to 90% by weight, based on a total amount of 100% by weight of the positive electrode active material layer constituting the positive electrode for the lithium secondary battery. If the content of the positive electrode active material is less than the above range, it is difficult for the electrode to sufficiently exert an electrochemical reaction. On the contrary, if the content exceeds the above range, there is a problem that the resistance of the electrode is increased and the physical properties of the electrode are lowered due to a relatively insufficient content of the electrically conductive material and the binder to be described later.

The positive electrode for the lithium secondary battery of the present invention contains montmorillonite as an additive.

The montmorillonite is a type of smectite, which is a clay mineral, and has a formula represented by $(Na,Ca)_{0.33}(Al, Mg)_2(Si_4O_{10})(OH)_2·nH_2O$. The pure montmorillonite consists of a combination of a silica tetrahedral sheet and an alumina octahedral sheet, and is formed by forming a layered structure through condensation reaction by a hydroxyl group between two silica tetrahedral sheets and one alumina octahedral sheet. The pure montmorillonite has a structure in which aluminum ions ($Al^{3+}$) are substituted with magnesium ions ($Mg^{2+}$) and iron ions ($Fe^{2+}$, $Fe^{3+}$) in the alumina octahedral sheet and silicon ions ($Si^{4+}$) are substituted with aluminum ions ($Al^{3+}$) in the silicate tetrahedral sheet, and thus has a negative charge as a whole. Accordingly, the pure montmorillonite contains cations and water molecules that can be exchanged between the layers to balance the overall charge.

As described above, as the montmorillonite exhibits a negative charge, when used as an additive for a lithium secondary battery, it improves transport properties for lithium ions and electrons, and thus it is possible to obtain an improved discharging capacity at the high-rate section. In addition, on the surface of the pure montmorillonite, a hydroxyl group ($OH^-$ radical) or an oxygen group ($O^-$ radical) is mainly distributed. Through this, since it is possible to adsorb the lithium polysulfide, the problems of sulfur loss caused by the leaching of the lithium polysulfide in the conventional lithium-sulfur battery, and loss of the capacity and occurrence of the side reaction caused by it are solved, and thus capacity and lifetime of a lithium-sulfur battery can be improved and it is possible to stably drive even when sulfur is highly loaded.

The montmorillonite is classified according to the type of cations present between the layers, and may comprise at least one selected from the group consisting of sodium montmorillonite, calcium montmorillonite, and magnesium montmorillonite. Preferably, sodium montmorillonite can be used.

The average particle diameter (D50) of the montmorillonite may be 1 to 15 μm. If the average particle diameter of the montmorillonite is within the above range, the effect of using the montmorillonite as an additive for the positive electrode can be obtained more effectively. Unless otherwise defined in the present invention, the average particle diameter (D50) refers to the diameter of particles whose cumulative volume is 50% by volume in the particle size distribution.

In the case of a modification treatment in which cations contained between the layer structures in the montmorillonite are substituted with specific cations through an ion exchange reaction, the gap between the layers is expanded, and finally, the layers can be exfoliated by being separated for each layer. In this way, when the layered structure of the multi-layers of montmorillonite is exfoliated and the modified montmorillonite formed in the form of a nanosheet is used as an additive for the positive electrode, the mobility of lithium ions and the confinement effect for lithium polysulfide can be further improved. Therefore, preferably, the additive may comprise montmorillonite modified by cation exchange.

The modified montmorillonite may be one in which cations such as sodium ions ($Na^+$), magnesium ions ($Mg^{2+}$), and calcium ions ($Ca^{2+}$) present between the layers of the montmorillonite are replaced with at least one selected from the group consisting of hydrogen ions ($H^+$), lithium ion (Lit), potassium ion ($K^+$), rubidium ion ($Rb^+$), cesium ion ($Cs^+$), iron ion ($Fe^{2+}$), manganese ion ($Mn^{2+}$), and nickel ion ($Ni^{2+}$) through a modifier. When considering lithium ion conductivity and the like, the modified montmorillonite may preferably be one substituted with at least one ion selected from hydrogen ions and lithium ions. More preferably, the modified montmorillonite may be one substituted with lithium ions.

The modified montmorillonite may be an exfoliated layered structure. This means that the montmorillonite having a layered structure in which a plurality of layers are stacked is exfoliated to form a nanosheet, as separation occurs between a plurality of layers by the modification treatment for replacing cations as described above. In this case, the nanosheet may have a thickness of 3 to 100 nm, preferably 10 to 20 nm. In addition, the length of the longest side of the nanosheet may be 1 to 15 μm, preferably 1 to 5 μm.

Whether the modified montmorillonite of the present invention has been modified can be confirmed by X-ray diffraction (XRD) measurement. A significant or effective peak in X-ray diffraction (XRD) analysis means a peak that is repeatedly detected in a substantially identical pattern in XRD data without being significantly affected by analytical conditions or analytical performers and in other words, means a peak having a height, intensity, strength, etc. of 1.5 times or more, preferably 2 times or more, more preferably 2.5 times or more, compared to a background level.

The modified montmorillonite comprises effective peaks that appear in the range of diffraction angles (2θ) of 7.0±1.0°, 9.0±1.0°, 20.0±1.0°, 26.5±1.0° and 28.0±0.5° respectively, as measured by X-ray diffraction (XRD) analysis using Cu-Kα X-ray wavelength, wherein it can be confirmed whether the modification was made through the presence or absence of an effective peak appearing at a diffraction angle of 7.0±1.0°.

In the present invention, the method for preparing the modified montmorillonite is not particularly limited in the present invention, and a method commonly used in the art may be used. Specifically, the method of preparing montmorillonite substituted with the specific cation, that is, modified montmorillonite may be carried out by a reaction of montmorillonite and a modifier. For example, when the modified montmorillonite is a modified montmorillonite substituted with a hydrogen ion, the modified montmorillonite can be prepared by acid treatment of montmorillonite with a hydrogen modifier. At this time, the acid treatment may be performed using a conventional method.

The montmorillonite is as described above.

The hydrogen modifier may be at least one selected from the group consisting of inorganic and organic acids. For example, the inorganic acid may be at least one selected from the group consisting of hydrochloric acid, nitric acid, hydrobromic acid, hydrofluoric acid, sulfuric acid and sulfonic acid. The organic acid may be at least one selected from the group consisting of acetic acid, oxalic acid, citric acid, succinic acid, formic acid, propanoic acid, butyric acid, propanedioic acid, butanedioic acid, pyruvic acid, glutamic acid, tartaric acid, malic acid, lactic acid, fumaric acid, itaconic acid, ascorbic acid and α-ketoglutaric acid. Preferably, the hydrogen modifier may be sulfuric acid.

The concentration of the hydrogen modifier may be 0.1 to 10 M, preferably 0.5 to 8 M, more preferably 0.8 to 5 M.

The montmorillonite is acid treated by introducing the montmorillonite and the hydrogen modifier into an aqueous solvent such as deionized water and reacting with stirring for 12 to 24 hours.

At this time, the mass ratio of the montmorillonite and the hydrogen modifier may be 1.0:1.0 to 1.0:8.0, preferably 1.0:2.0 to 1.0:5.0. If the mass ratio of the montmorillonite and the acid is less than the above range, there may be a problem of incomplete cation exchange reaction. On the contrary, if the mass ratio exceeds the above range, there may be a problem that the crystal structure of montmorillonite is collapsed.

The acid treatment may be performed multiple times, preferably 1 to 10 times, more preferably 2 to 8 times.

After the acid treatment, the hydrogen modifier can be removed by centrifugation or filtration.

In addition, after the acid treatment, a process of washing several times with water and ethanol may be performed.

Next, the final product of the acid treatment is dried at 60 to 90° C. to obtain modified montmorillonite, specifically hydrogen-modified montmorillonite (H-MMT). Preferably, the drying is performed under a vacuum condition for 12 to 24 hours.

In another example, if the modified montmorillonite is a modified montmorillonite substituted with lithium ions, the method for manufacturing the modified montmorillonite may comprise the steps of acid-treating montmorillonite with a hydrogen modifier and adding a lithium modifier to a solution containing hydrogen-modified montmorillonite (H-MMT) obtained through the acid-treatment.

The step of acid-treating montmorillonite with a hydrogen modifier is as described above.

The lithium modifier may be various types of lithium hydroxide, lithium nitrate, lithium chloride, lithium sulfate and the like, but preferably lithium hydroxide can be used, when considering the reaction condition.

The concentration of the lithium modifier may be 0.1 to 10 M, preferably 0.5 to 8 M, more preferably 0.8 to 5 M.

The lithium modifier is added to a solution containing the hydrogen modified montmorillonite (H-MMT), and the resultant mixture is stirred and reacted for 12 to 24 hours.

In the step of adding the lithium modifier, the mass ratio of the hydrogen-modified montmorillonite (H-MMT) and the lithium modifier may be 1.0:1.0 to 1.0:8.0, preferably 1.0:2.0 to 1.0:5.0. If the mass ratio of the hydrogen-modified montmorillonite and the lithium modifier is less than the above range, there may be a problem that the cation exchange reaction is incomplete. On the contrary, if the mass ratio exceeds the above range, there may be a problem that the crystal structure of montmorillonite is collapsed.

After the reaction with the lithium modifier, the lithium modifier can be removed by centrifugation or filtration.

In addition, after the reaction with the lithium modifier, a process of washing several times with water and ethanol may be performed.

Next, the final product obtained from the reaction with the lithium modifier is dried at 60 to 90 to obtain a modified montmorillonite, specifically a lithium-modified montmorillonite (Li-MMT). Preferably, the drying is performed under a vacuum condition for 12 to 24 hours.

The additive containing montmorillonite or modified montmorillonite in the positive electrode for the lithium secondary battery of the present invention may be contained in an amount of 1 to 10% by weight, preferably 3 to 7% by weight, and more preferably 3 to 5% by weight, based on a total amount of 100% by weight of the positive electrode active material layer constituting the positive electrode for the lithium secondary battery. If the content of the additive is less than the above range, the effect of improving the mobility characteristics of lithium ions and the effect of suppressing the leaching of lithium polysulfide are reduced, and the effect of improving the electrochemical reactivity of the positive electrode active material cannot be secured. On the contrary, if the content of the additive exceeds the above range, a problem of lowering lithium ion conductivity to be described later or increasing the internal resistance of the battery may occur. Therefore, it is preferable that the content of the additive is determined to be an appropriate content within the above-described range.

The positive electrode for the lithium secondary battery of the present invention may optionally further comprise a binder for well-attaching the electrically conductive material, which is a material that allows electrons to move smoothly within the positive electrode, and the positive electrode active material to the current collector.

The electrically conductive material is a material that acts as a path through which electrons move from the current collector to the positive electrode active material by electrically connecting the electrolyte and the positive electrode active material. The electrically conductive material can be used without limitation as long as it has electrical conductivity For example, as the electrically conductive material, carbon black such as SUPRA-P, DENKA BLACK, acetylene black, KETJEN BLACK, channel black, furnace black, lamp black, thermal black, and carbon black; Carbon derivatives such as carbon nanotubes and fullerene; electrically conductive fibers such as carbon fiber or metal fiber; carbon fluoride; metal powders such as aluminum powder and nickel powder; or electrically conductive polymers such as polyaniline, polythiophene, polyacetylene, and polypyrrole may be used alone or in combination.

The content of the electrically conductive material may be 1 to 10% by weight based on a total amount of 100% by weight of the positive electrode active material layer constituting the positive electrode for the lithium secondary battery. If the content of the electrically conductive material is less than the above range, it is difficult to transfer electrons between the positive electrode active material and the current collector, thereby reducing voltage and capacity. On the contrary, if the content of the electrically conductive material exceeds the above range, the proportion of the positive electrode active material may be relatively reduced, so that the total energy (charge amount) of the battery may be reduced. Therefore, it is preferable that the content of the electrically conductive material is determined to be an appropriate content within the above-described range.

The binder maintains the positive electrode active material in the positive electrode current collector, and organically connects the positive electrode active materials to increase the bonding force between them, and the binder may be any binder known in the art.

For example, the binder may be at least one selected from the group consisting of fluororesin-based binders including polyvinylidene fluoride (PVdF) or polytetrafluoroethylene (PTFE); rubber-based binders including styrene-butadiene rubber (SBR), acrylonitrile-butadiene rubber, and styrene-isoprene rubber; cellulose-based binders including carboxymethylcellulose (CMC), starch, hydroxypropyl cellulose, and regenerated cellulose; polyalcohol-based binders; polyolefin-based binders including polyethylene and polypropylene; polyimide-based binders; polyester-based binders; and silane-based binders, or mixtures or copolymers of two or more thereof.

The content of the binder may be 1 to 10% by weight, based on a total amount of 100% by weight of the positive electrode active material layer constituting the positive electrode for the lithium secondary battery. If the content of the binder is less than the above range, the physical properties of the positive electrode may be deteriorated, so that the positive electrode active material and the electrically conductive material may fall out. If the content of the binder exceeds the above range, the ratio of the positive electrode active material and the electrically conductive material in the positive electrode is relatively reduced, so that the capacity of the battery can be reduced. Therefore, it is preferable that the content of the binder is determined to be an appropriate content within the above-described range.

In addition, the present invention provides a lithium secondary battery comprising the positive electrode for the lithium secondary battery.

The lithium secondary battery comprises a positive electrode; a negative electrode; and an electrolyte interposed therebetween, wherein the positive electrode is the positive electrode for the lithium secondary battery according to the present invention.

The positive electrode may comprise a positive electrode current collector and a positive electrode active material layer coated on one or both sides of the positive electrode current collector.

The positive electrode current collector supports the positive electrode active material and is not particularly limited as long as it has high conductivity without causing chemical change in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector can enhance the bonding force with the positive electrode active material by having fine irregularities on its surface, and may be formed in various forms such as film, sheet, foil, mesh, net, porous body, foam, or nonwoven fabric.

The positive electrode active material layer may comprise a positive electrode active material, an additive, an electrically conductive material, and a binder. In this case, the positive electrode active material, the additive, the electrically conductive material, and the binder are as described above.

In the present invention, a method of manufacturing the positive electrode for a lithium secondary battery is not particularly limited, and a method known to a person skilled in the art or various methods modified thereof may be used.

For example, the positive electrode for the lithium secondary battery may be manufactured by preparing a slurry composition for a positive electrode having the above-described composition, and then applying it to at least one surface of the positive electrode current collector.

The slurry composition for the positive electrode contains the positive electrode active material and the additive as described above, and may further contain an electrically conductive material, a binder, and a solvent.

As a solvent, a solvent capable of uniformly dispersing the positive electrode active material, the additive, the electrically conductive material and the binder is used. As such a solvent, water is most preferred as an aqueous solvent. At this time, water may be a distilled water or a deionized water, but is not necessarily limited thereto, and if necessary, a lower alcohol which can be easily mixed with water may be used. Examples of the lower alcohol may comprise methanol, ethanol, propanol, isopropanol, butanol and the like. Preferably, they can be used in admixture with water.

The solvent may be contained at a level having a concentration sufficient to facilitate coating, and the specific content varies depending on the application method and apparatus.

The slurry composition for the positive electrode may additionally comprise, if necessary, a material commonly used for the purpose of improving its function in the relevant technical field. For example, a viscosity modifier, a fluidizing agent, a filler, etc. may be additionally contained.

The method of applying the slurry composition for the positive electrode is not particularly limited in the present invention, and may comprise, for example, a method such as doctor blade, die casting, comma coating, and screen printing. In addition, after molding on a separate substrate, the slurry for the positive electrode may be coated on the positive electrode current collector by pressing or lamination method.

After the application, a drying process for removing the solvent may be performed. The drying process is performed at a temperature and a period of time at a level capable of sufficiently removing the solvent and the conditions thereof vary depending on the type of solvent, and thus are not particularly limited in the present invention. For example, the drying method may comprise a drying method by warm air, hot air, or low-humidity air, a vacuum drying method, and a drying method by irradiation with (far)-infrared radiation or electron beam.

The drying rate is adjusted to remove the solvent as quickly as possible, within the range of rate that does not cause cracks in the positive electrode active material layer due to the normal stress concentration and that does not exfoliate the positive electrode active material layer from the positive electrode current collector.

Additionally, the density of the positive electrode active material in the positive electrode may be increased by pressing the current collector after drying. As a press method, methods, such as a mold press and a roll press, are mentioned.

The porosity of the positive electrode, specifically, the positive electrode active material layer prepared by the above-described composition and manufacturing method may be 50 to 80%, preferably 60 to 75%. If the porosity of the positive electrode is less than 50%, there are problems that the degree of filling of the slurry composition for the positive electrode containing the positive electrode active material, the additive, the electrically conductive material and the binder is too high, and thus the sufficient electrolyte capable of exhibiting ionic conduction and/or electrical conduction between the positive electrode active materials cannot be maintained, so that the output characteristics or cycle characteristics of the battery may be deteriorated and the overvoltage of the battery and the decrease in discharging capacity become serious. On the contrary, if the porosity of the positive electrode exceeds 80% and thus has an excessively high porosity, there are problems that the physical and electrical connection with the current collector is lowered, reducing adhesion and making reaction difficult and that the increased porosity is filled with the electrolyte, which may lower the energy density of the battery. Therefore, the porosity of the positive electrode is properly adjusted within the above range.

In particular, in the case of the positive electrode of the present invention, a thermally expanded-reduced graphene oxide having a high specific surface area and pore volume is contained as a positive electrode active material, and thus, a larger amount of sulfur can be evenly supported. Accordingly, in the present invention, the loading amount of sulfur in the positive electrode, that is, the mass of sulfur per unit area of the positive electrode active material layer in the positive electrode may be 2 to 15 $mg/cm^2$, preferably 6 to 10 $mg/cm^2$. As described above, the lithium secondary battery comprising the positive electrode according to the present invention can exhibit excellent discharging capacity and lifetime characteristics as it has a high loading amount of sulfur.

The negative electrode may comprise a negative electrode current collector and a negative electrode active material layer coated on one or both sides of the negative electrode current collector.

The negative electrode current collector supports the negative electrode active material and is as described in the positive electrode current collector.

The negative electrode active material layer may comprise an electrically conductive material, a binder, etc. in addition to the negative electrode active material. At this time, the electrically conductive material and the binder are as described above.

The negative electrode active material may comprise a material capable of reversibly intercalating or deintercalating lithium ($Li^+$), a material capable of reversibly forming lithium containing compounds by reacting with lithium ion, or lithium metal or lithium alloy.

The material capable of reversibly intercalating or deintercalating lithium ion ($Li^+$) can be, for example, crystalline carbon, amorphous carbon, or a mixture thereof.

The material capable of reacting with lithium ion ($Li^+$) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal, and specifically may be in the form of a lithium metal thin film or lithium metal powder.

A separator may be additionally comprised between the positive electrode and the negative electrode.

The separator enables the lithium ion to be transported between the positive electrode and the negative electrode while separating or insulating the positive electrode and the negative electrode from each other. Such separator may be made of a porous, nonconductive or insulating material and is not particularly limited as long as it is used as a separator in a lithium secondary battery. The separator may be an independent member such as a film, or a coating layer added to the positive electrode and/or the negative electrode.

It is preferable that the separator has excellent humidification ability for the electrolyte, while exhibiting low resistance to ion migration of electrolyte.

The separator may be made of a porous substrate. The porous substrate can be used as long as it is a porous substrate commonly used in a secondary battery, and may be composed of a porous polymer film alone or by laminating them, and for example, may be a non-woven fabric made of glass fiber or polyethylene terephthalate fiber with high melting point, etc., or a polyolefin-based porous film, but is not limited thereto.

The material of the porous substrate is not particularly limited in the present invention, and any material can be used as long as it is a porous substrate commonly used in an electrochemical device. For example, the porous substrate may comprise at least one material selected from the group consisting of polyolefin such as polyethylene and polypropylene, polyester such as polyethyleneterephthalate and polybutyleneterephthalate, polyamide, polyacetal, polycarbonate, polyimide, polyetheretherketone, polyethersulfone, polyphenyleneoxide, polyphenylenesulfide, polyethylenenaphthalate, polytetrafluoroethylene, polyvinylidene fluoride, polyvinyl chloride, polyacrylonitrile, cellulose, nylon, poly(p-phenylene benzobisoxazole, and polyarylate.

The thickness of the porous substrate is not particularly limited, but may be 1 to 100 μm, preferably 5 to 50 μm. Although the thickness range of the porous substrate is not particularly limited to the above-mentioned range, if the thickness is excessively thinner than the lower limit described above, mechanical properties are deteriorated and thus the separator may be easily damaged during use of the battery.

The average size and porosity of the pores present in the porous substrate are also not particularly limited, but may be 0.001 to 50 μm and 10 to 95%, respectively.

The electrolyte comprises lithium ions and is used for causing an electrochemical oxidation or reduction reaction between a positive electrode and a negative electrode through these.

The electrolyte may be a non-aqueous electrolyte solution or a solid electrolyte which does not react with lithium metal, but is preferably a non-aqueous electrolyte, and comprises an electrolyte salt and an organic solvent.

The electrolytic salt which is comprised in the non-aqueous electrolyte solution is lithium salt. The lithium salt can be used without limitation as long as it is commonly used in an electrolyte solution for a lithium secondary battery. For example, the lithium salt may be LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, LiN $(SO_2F)_2$, lithium chloroborane, lithium lower aliphatic carboxylate, lithium tetraphenyl borate, lithium imide, etc.

The concentration of the lithium salt may be 0.2 to 2 M, preferably 0.4 to 2 M, more preferably 0.4 to 1.7 M depending on various factors such as the exact composition of the electrolyte solvent mixture, the solubility of the salt, the conductivity of the dissolved salt, the charging and discharging conditions of the battery, the operating temperature, and other factors known in the lithium battery field. If the concentration of the lithium salt is less than 0.2 M, the conductivity of the electrolyte may be lowered and thus the performance of the electrolyte may be deteriorated. If the concentration of the lithium salt is more than 2 M, the viscosity of the electrolyte may increase and thus the mobility of the lithium ion may be reduced.

As the organic solvent contained in the non-aqueous electrolyte solution, those conventionally used in an electrolyte solution for a lithium secondary battery may be used without limitation, and for example, ether, ester, amide, linear carbonate, cyclic carbonate, etc. may be used alone or in combination of two or more. Among them, representatively, ether-based compounds may be comprised.

The ether-based compound may comprise acyclic ethers and cyclic ethers.

For example, the acyclic ether may be, but is not limited to, at least one selected from the group consisting of dimethyl ether, diethyl ether, dipropyl ether, methylethyl ether, methylpropyl ether, ethylpropyl ether, dimethoxyethane, diethoxyethane, ethylene glycol ethylmethyl ether, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, polyethylene glycol methylethyl ether.

For example, the cyclic ether may be, but is not limited to, at least one selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene, and isosorbide dimethyl ether.

Examples of the ester of the organic solvent may include, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, or a mixture of two or more thereof.

Specific examples of the linear carbonate compound may representatively comprise, but is not limited to, at least one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof.

In addition, specific examples of the cyclic carbonate compound may comprise at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a mixture of two or more thereof. Examples of such halides include, but are not limited to, fluoroethylene carbonate (FEC) and the like.

The electrolyte may further comprise nitric acid or nitrous acid-based compounds as an additive in addition to the aforementioned electrolyte salts and organic solvents. The nitric acid or nitrous acid-based compounds have an effect of forming a stable coating on lithium metal electrode, which is a negative electrode, and improving the charging/discharging efficiency.

The nitric acid or nitrous acid-based compounds is not particularly limited in the present invention and may comprise at least one selected from the group consisting of inorganic nitric acid or nitrous acid compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$), and ammonium nitrite ($NH_4NO_2$); organic nitric acid or nitrous acid compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, and octyl nitrite; organic nitro compounds such as nitromethane, nitropropane, nitrobutane, nitrobenzene, dinitrobenzene, nitropyridine, dinitropyridine, nitrotoluene, and dinitrotoluene, and the combinations thereof. Preferably, lithium nitrate is used.

The injection of the electrolyte solution may be performed at the appropriate stage of the manufacturing process of the electrochemical device, depending on the manufacturing process and required properties of the final product. That is, the injection can be performed before assembling the electrochemical device or at the final stage of assembling the electrochemical device.

The lithium secondary battery according to the present invention can be manufactured by lamination, stacking and folding processes of the separator and the electrodes, in addition to the usual winding process.

The shape of the lithium battery is not particularly limited, and may be various shapes such as a cylindrical shape, a laminate shape, and a coin shape.

Also, the present invention provides a battery module comprising the lithium secondary battery as a unit battery.

The battery module may be used as a power source for medium to large-sized devices requiring high temperature stability, long cycle characteristics, and high-capacity characteristics.

Examples of such medium to large-sized devices may comprise, but is not limited to, a power tool powered by an electric motor; an electric vehicle including an electric vehicle (EV), a hybrid electric vehicle (HEV), a plug-in hybrid electric vehicle (PHEV) and the like; an electric two-wheeled vehicle including an electric bike (E-bike) and an electric scooter (E-scooter); an electric golf cart; a power storage system, etc.

Hereinafter, in order to facilitate understanding of the present invention, preferred embodiments of the present invention will be described. However, it will be apparent to those skilled in the art that the following examples are only illustrative of the present invention and that various changes and modifications can be made within the scope and spirit of the present invention, and such changes and modifications are intended to be within the scope of the appended claims.

PREPARATION EXAMPLES

Preparation Example 1

Graphene oxide (SE2430, a product from sixth element company) was heat-treated at 400° C. for 10 minutes in an inert atmosphere to prepare thermally expanded graphene oxide.

The thermally expanded graphene oxide was heat-treated for 3 hours at a temperature of 900° C. in an inert atmosphere to prepare thermally expanded-reduced graphene oxide (TE-rGO).

Preparation Example 2

50 g of sodium montmorillonite (K 10, a product from SIGMA ALDRICH) was dried in an oven at 155° C. for 1 hour to obtain unmodified montmorillonite.

Preparation Example 3

50 g of sodium montmorillonite (K 10, a product from SIGMA ALDRICH) was added to 1 L of 1.0 M sulfuric acid solution and stirred at room temperature (25° C.) for 24 hours.

The solution obtained by stirring was centrifuged to remove the solvent, and dried in an oven at 80° C. for 12 hours to prepare hydrogen-modified montmorillonite (H-MMT).

50 g of the hydrogen-modified montmorillonite (H-MMT) was added to 1 L of 1.0 M lithium hydroxide solution and stirred at room temperature (25° C.) for 24 hours.

The solution obtained by stirring was centrifuged to remove the solvent, and dried in an oven at 80° C. for 12 hours to prepare lithium-modified montmorillonite (Li-MMT).

Experimental Example 1: Analysis of the Physical Properties of Thermally Expanded-Reduced Graphene Oxide The shape, specific surface area, pore volume, and average pore size of the thermally expanded-reduced graphene oxide prepared in Preparation Example 1 and the reduced graphene oxide (SE1231, a product from Sixth Element) were measured.

Specifically, the shape was observed with a scanning electron microscope (SEM), and at this time, S-4800 from HITACHI company was used as the scanning electron microscope. In addition, the specific surface area, pore volume, and average pore size were measured by BET 6-point method according to a nitrogen gas adsorption flow method using a porosimetry analyzer (BELL JAPAN INC, BELSORP-II MINI). The results thus obtained are shown in FIGS. 1 and 2 and Table 1 below.

TABLE 1

| | Specific surface area ($m^2/g$) | Pore volume ($cm^3/g$) | Average pore size (nm) |
|---|---|---|---|
| Preparation Example 1 (TE-rGO) | 921 | 5.13 | 22.28 |
| Reduced graphene oxide | 185 | 0.61 | 12.74 |

Referring to FIGS. 1 and 2, it can be seen that the thermally expanded-reduced graphene oxide (TE-rGO) of Preparation Example 1 has a crumpled paper structure, while the reduced graphene oxide exhibits a two-dimensional stacked structure.

In addition, it can be seen from Table 1 that the thermally expanded-reduced graphene oxide (TE-rGO) of Preparation Example 1 has a higher specific surface area, pore volume, and average pore size compared to the reduced graphene oxide. It can be seen that the thermally expanded-reduced graphene oxide (TE-rGO) of Preparation Example 1 has a crumpled paper structure by performing the thermal expansion and reduction steps, thereby having a higher specific surface area, pore volume, and average pore size compared to the reduced graphene oxide. In addition, it can be seen that by exhibiting the specific surface area and pore volume as described above, the thermally expanded-reduced graphene oxide (TE-rGO) of Preparation Example 1 can evenly support a larger amount of sulfur than the reduced graphene oxide.

Experimental Example 2: Analysis of Physical Properties of Montmorillonite

The shape of the montmorillonite according to Preparation Examples 2 and 3 was observed with a scanning electron microscope (SEM) and at this time, S-4800 from HITACHI company was used as the scanning electron microscope.

In addition, X-ray diffraction (XRD) analysis was performed on montmorillonite, hydrogen-modified montmorillonite (H-MMT) and lithium-modified montmorillonite (Li-MMT) of Preparation Examples 2 and 3. The XRD apparatus used for the analysis was a RIGAKU MINIFLEX 600 X-ray diffraction analysis equipment using a 1.5418 Å Cu-Kα X-ray wavelength as a solid phase detector. The results thus obtained are shown in FIGS. 3 to 5.

Referring to FIGS. 3 and 4, it can be seen that the montmorillonite according to Preparation Example 2 (see FIG. 3) is not exfoliated at all, whereas the modified montmorillonite prepared according to Preparation Example 3 (see FIG. 4) has a thin nanosheet form due to exfoliation of the interlayer structure.

It can be seen from FIG. 5 that in the case of Preparation Example 3, an effective peak was observed at a diffraction angle (2θ) of 7.0±1.0°, so that the modified montmorillonite of the present invention was prepared.

EXAMPLES AND COMPARATIVE EXAMPLES

Example 1

The thermally expanded graphene oxide (TE-rGO) obtained in Preparation Example 1 and sulfur were mixed at a weight ratio of 3:7, and then reacted for 35 minutes at a temperature of 155 to obtain a sulfur-carbon composite in which sulfur is supported on the inner (pore) and outer surfaces of TE-rGO.

86% by weight of the above-prepared sulfur-carbon composite (S:CNT=75:25) as positive electrode active material, 4.5% by weight of DENKA BLACK as an electrically conductive material, 4.5% by weight of styrene butadiene rubber/carboxymethyl cellulose (SBR:CMC=7:3) as a binder, and 5% by weight of montmorillonite obtained in Preparation Example 2 as an additive were added and mixed to prepare a slurry composition for a positive electrode.

The slurry composition for the positive electrode was coated on an aluminum current collector having a thickness of 20 μm, dried at 50 for 12 hours, and pressed with a roll press device to manufacture a positive electrode. At this time, the loading amount of the positive electrode active material was 5 mAh/cm$^2$ or less, and the loading amount of sulfur was 6.7 mg/cm$^2$.

Example 2

A positive electrode was manufactured by performing the same procedure as in Example 1, except that when preparing the slurry composition for the positive electrode, the same amount of the lithium-modified montmorillonite (Li-MMT) of Preparation Example 3 instead of the montmorillonite of Preparation Example 1 was used as an additive.

Example 3

A lithium secondary battery was manufactured by placing the positive electrode prepared in Example 1 and a negative electrode to face each other, interposing a polyethylene separator with a thickness of 20 μm and a porosity of 45%, and injecting 70 μℓ of an electrolyte.

At this time, a lithium metal thin film with a thickness of 35 μm was used as a negative electrode, and a mixed solution was prepared by dissolving 1 M of lithium bis(trifluoromethanesulfonyl)imide (LiTFSI) and 1% by weight of lithium nitrate (LiNO$_3$) in an organic solvent which consists of 1,3-dioxolane and diethylene glycol dimethyl ether (DOL:DEDM=1:1 (volume ratio) was used as an electrolyte.

Example 4

A lithium secondary battery was manufactured by performing the same procedure as in Example 3, except that the positive electrode of Example 2 instead of the positive electrode of Example 1 was used as a positive electrode.

Comparative Example 1

A positive electrode was manufactured by performing the same procedure as in Example 1, except that a slurry composition for the positive electrode containing 90% by weight of sulfur-carbon composite as a positive electrode active material, 5% by weight of DENKA BLACK as an electrically conductive material, 5% by weight of styrene butadiene rubber/carboxymethyl cellulose (SBR:CMC=7:3) as a binder was used, without using an additive.

Comparative Example 2

A lithium secondary battery was manufactured by performing the same procedure as in Example 3, except that the positive electrode of Comparative Example 1 instead of the positive electrode of Example 1 was used as the positive electrode.

Experimental Example 3: Evaluation of Performance of Lithium Secondary Battery (1) Measurement of Initial Discharging Capacity For the batteries manufactured in Example 3, Example 4, and Comparative Example 2, a change in charging/discharging characteristics was tested using a charging/discharging measuring device (LAND CT-2001A, a product from WUHAN company). The obtained battery was examined for initial discharging capacity under 0.1 C/0.1 C charging/ discharging conditions, and the results are shown in FIG. 6.

(2) Measurement of Lifetime Characteristics

For the batteries manufactured in Example 3, Example 4 and Comparative Example 2, lifetime characteristics were measured by charging/discharging at 0.1 C/0.1 C during the initial 3 cycles, charging/discharging at 0.2 C/0.2 C during the subsequent 3 cycles, and then charging/discharging at 0.3 C/0.5 C, thereby repeating 40 cycles of charging/discharging by using a charging/discharging measuring device (LAND CT-2001A, a product from WUHAN company), and the results are shown in FIG. 7.

As shown in FIGS. 6 and 7, it can be seen that the batteries according to the Examples have superior initial discharging capacity and lifetime characteristics compared to the Comparative Example.

Specifically, referring to FIG. 6, it can be seen that the initial discharging capacity of the batteries according to the Examples is 1170 mAh/g or more, while the initial discharging capacity of the batteries of the Comparative Example is approximately 1120 to 1140 mAh/g.

In the case of the lithium secondary batteries of Examples 3 and 4, it can be seen that the carbon material of sulfur-carbon composite, which is the positive electrode active material, is the thermally expanded graphene oxide (TE-rGO) of Preparation Example 1, and montmorillonite and modified montmorillonite respectively are used as an additive, and the thermally expanded graphene oxide (TE-rGO) has a high specific surface area and pore volume as measured in Experimental Example 1, and thus can evenly support a large amount of sulfur, thereby contributing to the reactivity improvement of sulfur, and the additive improves the mobility characteristics of lithium ions and the confinement effect of lithium polysulfide, thereby greatly increasing the initial discharging capacity.

On the other hand, in the case of the lithium secondary battery of Comparative Example 2, it can be seen that the positive electrode that does not contain the additive is comprised, and thus the movement of lithium ions is limited, so that the initial discharging capacity is lower than those of Examples.

Therefore, in the case of the lithium secondary battery of the present invention, since the thermally expanded graphene oxide (TE-rGO), which has a very high specific surface area and pore volume, is used as the carbon material of the sulfur-carbon composite, which is a positive electrode active material, a larger amount of sulfur can be evenly supported, the reactivity of sulfur is increased, and since the additive is contained, the mobility characteristics of lithium ions in the positive electrode is improved, and thus a high initial discharging capacity may be displayed.

In addition, referring to FIG. 7, the lithium secondary battery of Example 4 had a discharging capacity of about 800 mAh/g at a high-rate section of 0.5 C and maintained the capacity for 40 cycles. In the case of the lithium secondary battery of Example 3, although the discharging capacity at a high-rate section of 0.5 C was 600 mAh/g or more, it could not be maintained at a certain level. On the other hand, in the case of the lithium secondary battery of Comparative Example 2, the discharging capacity was less than 600 mAh/g at a high-rate section of 0.5 C.

From these results, it can be confirmed that in the case of the lithium secondary battery of the present invention, when using the modified montmorillonite as an additive, the lifetime characteristics of the lithium secondary battery is the best.

The invention claimed is:

1. A positive electrode for a lithium secondary battery comprising:

a positive electrode active material; and an additive, wherein the positive electrode active material comprises a sulfur-carbon composite comprising thermally expanded-reduced graphene oxide and sulfur, and the additive comprises montmorillonite modified by cation exchange, wherein the modified montmorillonite is montmorillonite wherein a cation thereof is substituted with at least one ion selected from hydrogen ions, lithium ions, potassium ions, rubidium ions, cesium ions, iron ions, manganese ions and nickel ions, wherein in the sulfur-carbon composite, the sulfur is present on an inner surface and an outer surface of the thermally expanded-reduced graphene oxide, wherein the thermally expanded-reduced graphene oxide has a specific surface area of 700 to 1200 $m^2$/g, wherein the thermally expanded-reduced graphene oxide has a pore volume of 3 to 7 $cm^3$/g, and wherein the additive is present in an amount of 1 to 10% by weight based on a total amount of 100% by weight of the positive electrode active material layer.

2. The positive electrode for the lithium secondary battery according to claim 1, wherein the thermally expanded-reduced graphene oxide has an electrical conductivity of 20 to 200 S/cm.

3. The positive electrode for the lithium secondary battery according to claim 1, wherein the sulfur comprises at least one selected from the group consisting of inorganic sulfur, $Li_2S_n(n≥1)$, a disulfide compound, an organic sulfur compound, and a carbon-sulfur polymer $((C_2S_x)_n$: x=2.5 to 50, n≥2).

4. The positive electrode for the lithium secondary battery according to claim 1, wherein the montmorillonite comprises at least one selected from the group consisting of sodium montmorillonite, calcium montmorillonite, and magnesium montmorillonite.

5. A lithium secondary battery comprising the positive electrode for the lithium secondary battery according to claim 1; a negative electrode; and an electrolyte.

6. The lithium secondary battery according to claim 5, wherein the positive electrode has a loading amount of sulfur of 2 to 15 mg/$cm^2$.

* * * * *